United States Patent
Virskus (10) Patent No.: US 9,519,297 B1
(45) Date of Patent: Dec. 13, 2016

(54) DYNAMIC DIFFERENTIAL ENERGY CONTROL OF HYDRONIC HEATING OR COOLING SYSTEMS

(76) Inventor: Vytautas K. Virskus, Mason, MI (US)

( * ) Notice: Subject to any disclaimer, the term of this patent is extended or adjusted under 35 U.S.C. 154(b) by 1004 days.

(21) Appl. No.: 13/208,603

(22) Filed: Aug. 12, 2011

Related U.S. Application Data (60) Provisional application No. 61/374,304, filed on Aug. 17, 2010.

(51) Int. Cl.
*F24F 11/06* (2006.01)
*G05D 23/19* (2006.01)

(52) U.S. Cl.
CPC .................. *G05D 23/1927* (2013.01)

(58) Field of Classification Search
CPC  G05D 23/00; G05D 23/1902; G05D 23/1927; G05D 23/222; G05D 7/00
USPC ............... 165/244, 247, 218, 287, 293, 297
See application file for complete search history.

(56) References Cited

U.S. PATENT DOCUMENTS

| | | | |
|---|---|---|---|
| 4,371,315 A | 2/1983 | Shikasko | |
| 4,574,870 A * | 3/1986 | Weitman | 165/292 |
| 5,651,264 A | 7/1997 | Lo et al. | |
| 5,707,007 A | 1/1998 | Fiedrich | |
| 5,963,458 A | 10/1999 | Cascia | |
| 6,629,423 B1 * | 10/2003 | Hirooka et al. | 62/208 |
| 7,044,213 B2 * | 5/2006 | Chang et al. | 165/263 |
| 2003/0019221 A1 * | 1/2003 | Rossi et al. | 62/127 |
| 2007/0074863 A1 * | 4/2007 | Ichinose et al. | 165/247 |

\* cited by examiner

*Primary Examiner* — Travis Ruby
(74) *Attorney, Agent, or Firm* — Brooks Kushman P.C.

(57) ABSTRACT

A system and method for controlling a building system includes a supply temperature sensor upstream of a thermal load, a return temperature sensor downstream of the thermal load, and a controller. The controller is configured to calculate an actual thermal energy difference from the supply and return temperature sensors. The controller is configured to control a flow rate of a pump such that the measured thermal energy difference is equal to a desired thermal energy difference for the system, and the measured thermal energy difference is constant for a time interval. A system and method for controlling a building system includes determining a desired thermal energy difference for a load, measuring a supply and return temperature of the load, and reducing the system flow rate such that a valve controlling the load flow rate is at an at partially open condition when the return temperature of the load is the desired return temperature.

19 Claims, 6 Drawing Sheets

Pressure Control
Continuous Re-circulation Through Decoupler

Figure 6

DYNAMIC DIFFERENTIAL ENERGY CONTROL OF HYDRONIC HEATING OR COOLING SYSTEMS

CROSS-REFERENCE TO RELATED APPLICATIONS

This application claims the benefit of U.S. provisional Application No. 61/374,304 filed Aug. 17, 2010, the disclosure of which is incorporated in its entirety by reference herein.

TECHNICAL FIELD

The present invention relates to thermal energy distribution systems using circulating water as the energy transfer medium.

BACKGROUND

Closed loop thermal energy distribution systems circulate an energy transfer medium to heat or cool buildings or equipment. Heat is absorbed or dissipated to or from the medium to heat or cool loads that are in thermal contact with the closed loop water circulation system.

Prior art water circulation control systems have generally focused on chiller/boiler temperature and pressure supply control and not building dynamic load. The prior art systems generally relied on pressure measurements to control the system volume flow by inducing sufficient flow through pressure supplied by the pump in the system. The pressure in the system however is not directly related to the cooling load required by the building.

The pressure in prior art systems is generally controlled using a fixed speed pump in combination with valving, or through the use of a variable speed pump motor in combination with valving, such as a centrifugal pump with a variable speed motor and a balancing valve. Pressure control of a system is not possible when there are no valves present in the system, or may be difficult when a water bypass is present, allowing for unrestricted flow of water in the system.

There is a need for a control method for a water circulation system that is based upon actual heating or cooling load on the system.

SUMMARY

The present invention provides discrete control for a heating or cooling water circulation system using the input and output temperature difference in the system, and the flow rate of water in the system to meet a heating or cooling load on the system, allowing for control over a large range of system designs using a fundamental approach that is based upon the actual thermal load.

DETAILED DESCRIPTION

As required, detailed embodiments of the present invention are disclosed herein; however, it is to be understood that the disclosed embodiments are merely exemplary of the invention that may be embodied in various and alternative forms. The figures are not necessarily to scale; some features may be exaggerated or minimized to show details of particular components. Therefore, specific structural and functional details disclosed herein are not to be interpreted as limiting, but merely as a representative basis for teaching one skilled in the art to variously employ the present invention.

Figure 1:
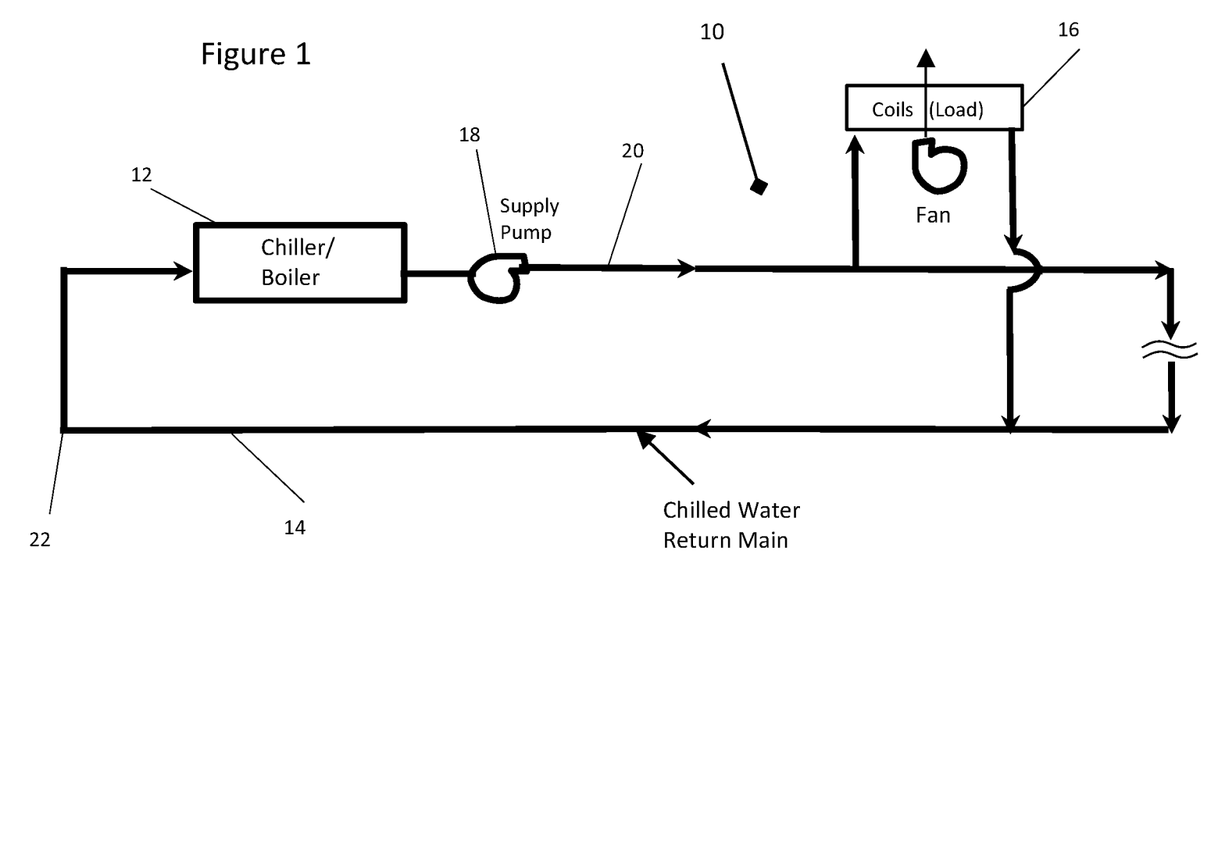
FIG. 1 is a schematic of an embodiment of a closed water loop for use with a building heating or cooling system.

FIG. 1 illustrates an embodiment of a closed water loop 10 that may be used with a building system to provide water for heating or cooling. The building system may be related to air conditioning, including area heating, area cooling and de-humidification, or other functions. The closed water loop 10 may also be provided for industrial process cooling, building heating and cooling systems, water heating, and other systems as are known in the art.

The closed water loop 10 has a thermal source 12 to provide water through piping 14 in the loop 10 at a controlled temperature to a building load 16. The thermal source 12 is a chiller system that provides chilled water to the building load 16. The chiller 12 may be absorption, centrifugal, helical rotary, reciprocating, or the like, and may be either air-cooled or water-cooled. Alternatively, the thermal source 12 may be a boiler system that provides heated water to the building load 16. The building load 16 is a heat exchanger or other system to support the building system. In further embodiments, the building load 16 includes any number of heat exchangers, arranged in series, in parallel, or a combination thereof. The building load 16 acts as a heat source or a heat sink. A heat source provides heat, i.e. using high temperature water in a heat exchanger, to the building. A heat sink absorbs and removes heat, i.e. using low temperature water in a heat exchanger, from the building.

A pump 18 circulates water in the system 10. The pump 18 may be integrated into the thermal source 12. Alternatively, the pump 18 may be placed elsewhere in the loop 10, for example, before the thermal source 12.

The closed water loop system 10 of FIG. 1 includes no valves, and as such, the pressure cannot be controlled by a valve to control the flow and temperature of water in the loop 10 delivered to the building load 16, as is common in the prior art. The water loop system 10 is controlled directly though the building load 16 and the use of the flow rate and water temperatures taken at various locations in the loop 10, as shown in the heat transfer equation:

$$Q = C \times V \times \Delta T \tag{1}$$

where Q is a heat flow rate (btu/hr), V is the volumetric flow rate (gpm), C is a constant defined below (typically 500 (Btu×min)/(gal×hr×F)), and ΔT is a temperature difference (F).

For example, the building or system load is calculated using equation (1) where the supply of chilled (or heated)

water to a building or system is controlled by determining the instantaneous thermal load ($Q_{i,Load}$) of the building or system being heated or cooled. The constant, C, is often assumed to be 500, however the constant may vary due to changes in density or changes in specific heat. The constant, C ((Btu×min)/gal×hr×F), may be calculated using the equation:

$$C = \rho \times C_p \times 60(\text{min/hr}) \times 0.134(\text{ft}^3/\text{gal}) \qquad (2)$$

where $\rho$ is the fluid density of water (lbm/ft3), and $C_p$ is the specific heat of water (Btu/(lbm×F)). Values for the density of water at varying temperatures are given below in Table 1. The density of water at 60 degrees Fahrenheit is 8.33 lbm/gallon. The specific heat of liquid water is 1.000 Btu/(lbm F). The specific heat of liquid water is generally constant across a wide temperature and pressure range.

| Temperature (F.) | Density (lbm/ft^3) |
|---|---|
| 32 | 62.42 |
| 40 | 62.43 |
| 50 | 62.41 |
| 60 | 62.37 |
| 68 | 62.31 |
| 70 | 62.30 |
| 80 | 62.22 |
| 90 | 62.11 |
| 100 | 62.00 |
| 140 | 61.38 |
| 160 | 61.00 |
| 180 | 60.58 |
| 200 | 60.12 |
| 212 | 59.53 |

The hydronic thermal energy delivered to a building load is equal to the absolute value of the difference between thermal energy supplied to a heating or cooling system ($Q_S$), and the thermal energy returning from the system after servicing the loads ($Q_R$), which can be written as the formula:

$$|Q_S - Q_R| = \Delta Q_{S-R} \qquad (3)$$

or, $$\Delta Q_{S-R} = |C \times V_S \times \Delta T_S - C \times V_R \times \Delta T_R| \qquad (4)$$

or simply, ($\Delta Q$).

The instantaneous building or system thermal load, $Q_{i,Load}$, the instantaneous thermal energy delivered by system 10, $Q_{i-Delivered}$. The $Q_{i-Delivered}$ is calculated using equation (1) which depends on both the volumetric flow rate (V), in gpm, and the temperature difference, $\Delta T$ (° F.), between the supply temperature and the return temperature in the loop 10. Therefore, the temperature difference can be calculated as: $\Delta T = |T_s - T_r|$, or the absolute value of the difference between the supply temperature and the return temperature. The supply temperature, $T_s$, is measured using a sensor 20 located downstream of the thermal source 12, or at the thermal source 12 outlet. The return temperature, $T_r$, is measured using a sensor 22 located upstream of the thermal source 12, or at the thermal source inlet 12.

In one example, the $\Delta T$ across the thermal source 12 is kept at an approximately constant value for an incremental time period, i. The energy delivered can be discretely controlled at a specified flow by keeping the $\Delta T$ constant for each incremental time (i), and varying the instantaneous flow (Vi). Although the varying loads may change the total instantaneous thermal energy demand exhibited by the system for any incremental time period (i), the energy supplied and the energy demand can be equalized automatically, from a control standpoint, for each incremental $\Delta_{Ti-Constant}$. During this time, the volumetric flow rate, V, can be varied using a variable frequency drive 24, on the pump 18 to produce $V_i$ which results in the desired $Q_{i-delivered}$ in the system 10 to accommodate the instantaneous load on the building. $Q_{i-Delivered}$ is based on the equation:

$$Q_{i-Delivered} = C \times Vi \times \Delta T_{i-Constant} \qquad (5)$$

where C is the constant defined in equation (2), $V_i$ is the flow rate, and $\Delta T_{i-Constant}$ is the temperature difference. The flow rate V is adjusted based on the thermal load to maintain a constant design, or optimized, $\Delta T$. Once the optimum or desired $\Delta T$ is established through use of equation (5), $\Delta T$ remains constant and is modified to accommodate excessive thermal loads, for example, excessive outdoor ambient humidity for an HVAC application. The speed of the pump 18 is adjusted using the variable frequency drive 24 and a controller 26. The controller or control algorithm 26 may be incorporated into a building automation system, a residential hydronic heating control system, or may be a stand-alone control apparatus. The controller 26 may be connected to or have a user interface integrated into it. The user interface provides an input screen, a series of buttons or switches, or the like for a user to input information or settings to the controller. The user input may be used for example in the initial setup of the controller 26, or to modify the settings. The user input through the user interface to the controller may include: the location of the system, the weather zone from a series of predetermined zones or patterns, the pipe size of the system, whether the system is a chilled water system or a hot water system, the type of system architecture, and the like.

For systems with multiple loads, $Q_{i-Delivered}$ is the sum of all the system loads (1 through n) as defined by:

$$Q_{i-Delivered} = \Sigma(C \times Vi(1) + \ldots + C \times Vi(n)) \times \Delta T_{i-Constant}) \qquad (6)$$

and where for one of the individual loads, $Q_{i-load}$ can be expressed as the following:

$$Q_{i-load} = (C \times V_{i-load} \times \Delta T_{i-load}) \qquad (7)$$

the load, $V_{i-load}$, is controlled by the valve position to the load changing, and includes limitations based on the piping to the load.

The controller 26 monitors the water temperature difference by monitoring the water temperature provided by the thermal source 12 as measured by supply temperature sensor 20 and the water temperature returning to the thermal source as measured by return temperature sensor 22.

The controller 26 may also use additional inputs in the system 10, including: ambient temperature measurements, desired setpoint temperature inputs, temperature measurements from the discharge side of the building load 16, humidity measurements, and the like. Additionally, the controller 26 may provide a higher or lower heat flow rate through the system 10 based on transient inputs, such as daily or seasonal ambient temperature changes, high or low ambient humidity, or the like.

The thermal source 12 may be independent of control by the controller 26 and use an internal control and operation strategy based on temperature measured by an outside air temperature sensor, or other inputs, to determine the temperature of the water it is providing to the loop 10. The thermal source 12 may be a variable speed system, or may be a series of multiple thermal sources.

In contrast, the system 10 is controlled without the use of pressure sensors or pressure measurements. This allows for the reduction of energy used by pump 18, as the pump 18 use is based on response to actual building loads and needs that are directly related to the energy required by the building load 16 and evidenced through the temperature difference in the loop 10. Actual building loads and needs include independent variables such as occupancy, lighting, and equipment ("plug") loads; outside temperature, solar, wind, and other related weather loads; equipment status (on or off), ventilation damper adjustment and position, variations in motor speeds; total pumping or air volumes needed due to dynamic water or air balance characteristics; dynamic valve positioning in the chilled or heating water distribution systems, and the like.

The system and control strategy discussed with respect to FIG. 1 may be useful in cases that are difficult to control using traditional pressure measurements. For example, in an industrial process cooling system, the water loop runs continuously to provide cooling to machines in the production process. In the prior art, this is often run continuously using a fixed speed pump. Using the present invention, the water loop 10 may be run at a minimum speed, lower than the operational speed, when the process cooling system is operating at low production rates, and therefore lower cooling demand.

In another example, a water loop system 10 may be used with a condenser loop, i.e. with a welding machine. In the prior art, the cooling system is usually operated at constant flow, including when cooling is not required due to no cooling load or a low ΔT. Using the present invention, the flow rate in the cooling system 10 may be reduced when there is no or low cooling load required. Based upon a low temperature difference input, the controller 26 reduces the flow rate of the water in the system 10, to conserve energy.

In general, the controller 26 increases the flow rate of water provided by the pump 18 in the system 10 to provide a higher cooling capacity as the temperature difference within the system 10 increases. The temperature difference within the system 10 is determined using temperatures measured at the supply temperature sensor 20 and the return temperature sensor 22. The controller 26 decreases the flow rate of water provided by decreasing the motor speed of the pump 18 in the system 10 as the temperature difference within the system 10 decreases, thereby reducing the amount of cooling capacity provided to the heat exchanger 16. These adjustments by the controller 26 occur in real time, with an instantaneous change following an empirically determined time delay.

If a boiler is used instead of the chiller 12 to provide heated water to the system 10, the controller 26 increases the flow rate of water provided by the pump 18 by increasing the speed of the pump motor in the system 10 as the temperature difference within the system 10 increases, to provide a higher heating capacity to the heat exchanger 16. The controller 26 decreases the flow rate of water provided by the pump 18 in the system 10 as the temperature difference within the system 10 decreases, indicating a reduction in heating demand, thereby reducing the amount of heating capacity provided to the heat exchanger 16. The temperature difference within the system 10, and therefore the total heating or cooling thermal load, can be calculated using temperature measurements taken from the supply temperature sensor 20 and the return water temperature sensor 22.

Figure 2:
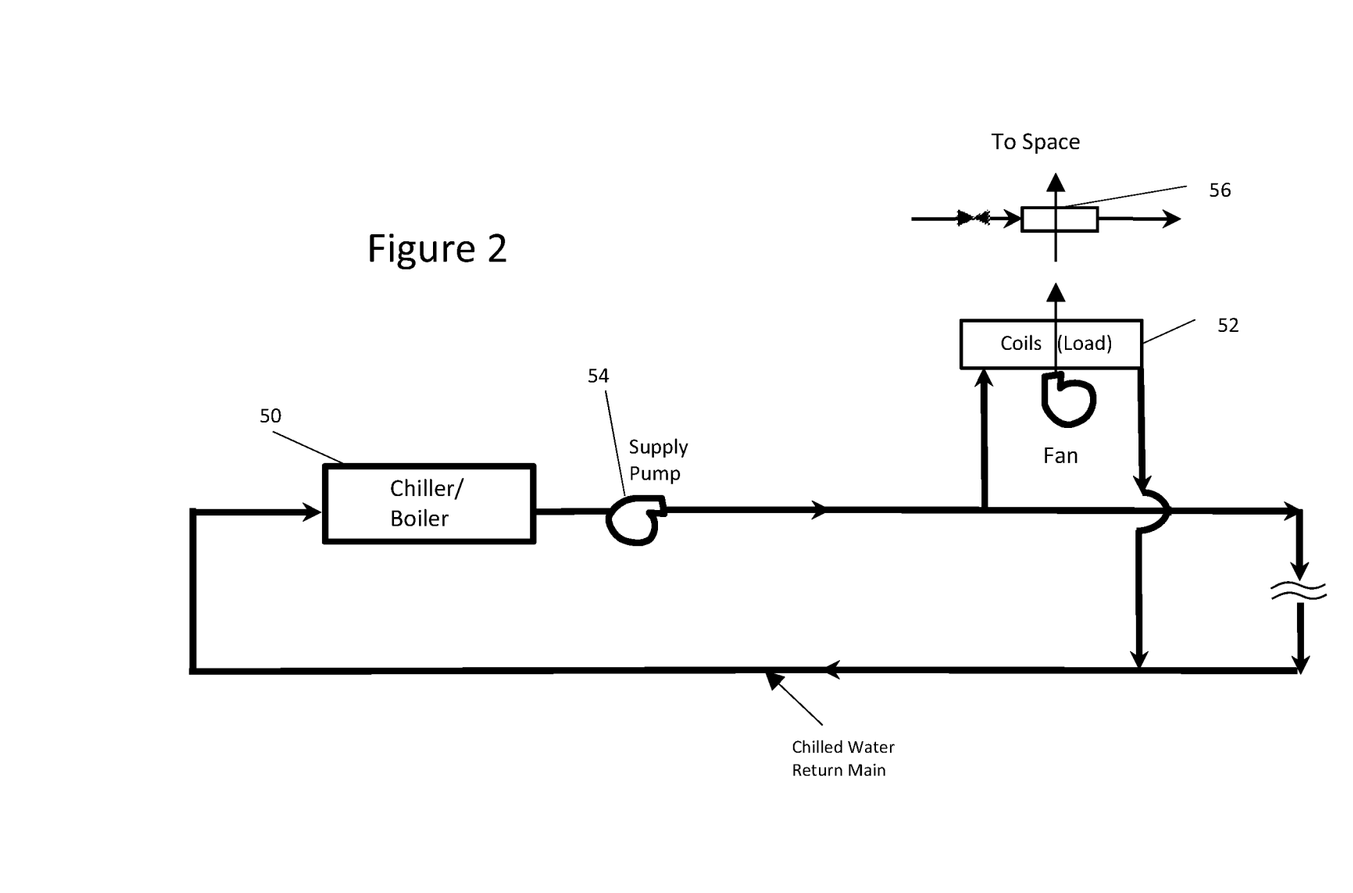
FIG. 2 is a schematic of another embodiment of a heating or cooling system in conjunction with a secondary and tertiary heat transfer mechanism.

The heating/cooling fluid delivery in the loop 10 can be adjusted to match or be very close to the minimum energy required by the system (Qi,Load) using dynamic differential energy control. For example, as shown in FIG. 2, water from the primary thermal input system 50 is delivered to a secondary system 52 (such as a heat exchanger for a building fan system) using a pump 54. The temperature controls for the secondary system 52 will keep the air discharge temperature for each respective heating or cooling unit within its controlled temperature range, and therefore not over-condition discharge air flowing across the coil 52. If the discharge air temperature goes outside its controlled range and becomes over-cooled, the over-cooled air would need to be further tempered by other downstream mechanisms 56, such as electric or hydronic reheat, resulting in the additional expenditure of energy. This additional energy used in "tertiary" (downstream) heat exchanger 56 for further conditioning air can be decreased through discrete control of energy delivery to the secondary heat exchanger 52 and the tertiary heat exchanger 56 using dynamic differential energy control.

Figure 3:
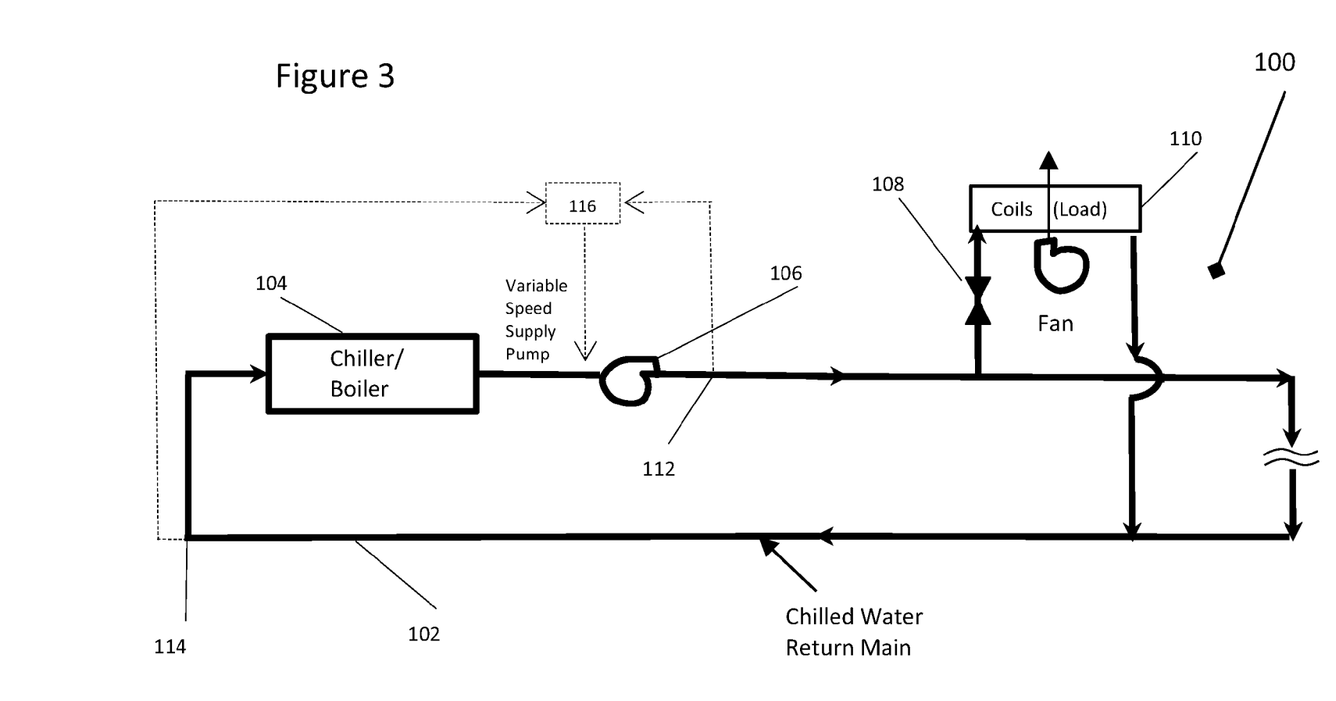
FIG. 3 is a schematic of yet another embodiment of a closed water loop for use with a building heating or cooling system.

FIG. 3 illustrates a system 100 having a two-way valve 108. The system 100 includes a closed loop 102 for water. A thermal source 104 provides conditioned water to the loop 102. The thermal source may be a chiller to provide chilled water or a boiler to provide heated water. The thermal source 104 may be a single unit, or a system of multiple units. A pump 106 is located downstream of the thermal source 104, although the pump 106 may be located in other locations in the system 100. In one embodiment, the pump 106 has a variable frequency drive 107, allowing for varying pump speeds and therefore varying flow rates of water through the loop 102. A two-way valve 108, such as a motorized control valve, may be located in the closed loop 102. A building load 110 is also included in the system 100. The building load 110 is often a heat exchanger for conditioning air. In one embodiment, the building load 110 is any number of heat exchangers arranged in series, in parallel, or any combination thereof.

For example, the valve 108 may be targeted for operation approximately halfway open, within its most effective operating range, to allow for maximum adjustment of the cooling or heating in the system 100. With the valve 108 halfway open, the valve 108 may be modulated open or closed without approaching the fully open or fully closed limits of the valve 108. The control of the valve 108 in combination with pump 106 control, facilitates the most effective, and efficient control over the system 100. A supply temperature sensor 112 is located downstream of the thermal source 104 to measure the temperature of the supply water in the loop 102. A return temperature sensor 114 is located upstream of the thermal source 104 to measure the temperature of the return water in the loop 102. A controller 116 uses inputs from the temperature sensors 112, 114 to determine the temperature difference across the loop 102. The controller 116 is in communication with the pump 106 and variable frequency drive 107 to control the flow rate of water in the loop 102. The controller 116 may also be in communication with the valve 108 to control the valve position. The controller 116 uses Equation (5) and the control strategy discussed previously with respect to FIG. 1 as the basis for controlling the system 100.

Multiple building loads 110, such as multiple heat exchangers or other devices, may be used with system 100. A balancing valve 108 may be associated with each building load 110. A minimum flow is specified for the system 100 so that the system 100 has sufficient flow to satisfy minimum volume requirements. The valves 108 are maintained within a desired position operating range with a safety factor. It is typically desirable to operate the valves 108 near 60% open; however, the system 100 design typically allows for operation of the valves 108 between 30-80% open with superior performance, as opposed to hydronic control valves operating at 5-10% open due to excessive heating or cooling water supply. The valves 108 may be individually controlled such that a valve 108 to a building load 110 with a high cooling or heating requirement is open more than a valve 108 to a building load 110 with low or no cooling/heating requirement. The position of the valves 108 may also be controlled using the flow rate in the system 100 provided by the pump 106. If the valves 108 are near closed, i.e. at 10% open, the pump 106 may reduce the flow rate of water through the system 100, to allow the valves 108 to be opened further to operate at, or nearer to a design condition.

Of course, in various embodiments, pressures at various locations may be measured in the system 100 and provide an override for the differential energy control, which is based on temperatures and flow rates in the system 100. For example, in a cooling system 100, a safety override control mechanism using pressure measurements may be used to slow or stop the pump 106 in the event of a failure, such as a power failure causing the valves 108 to close automatically resulting in a pressure surge in the system 100 if the pump 106 continues to operate.

Figure 4:
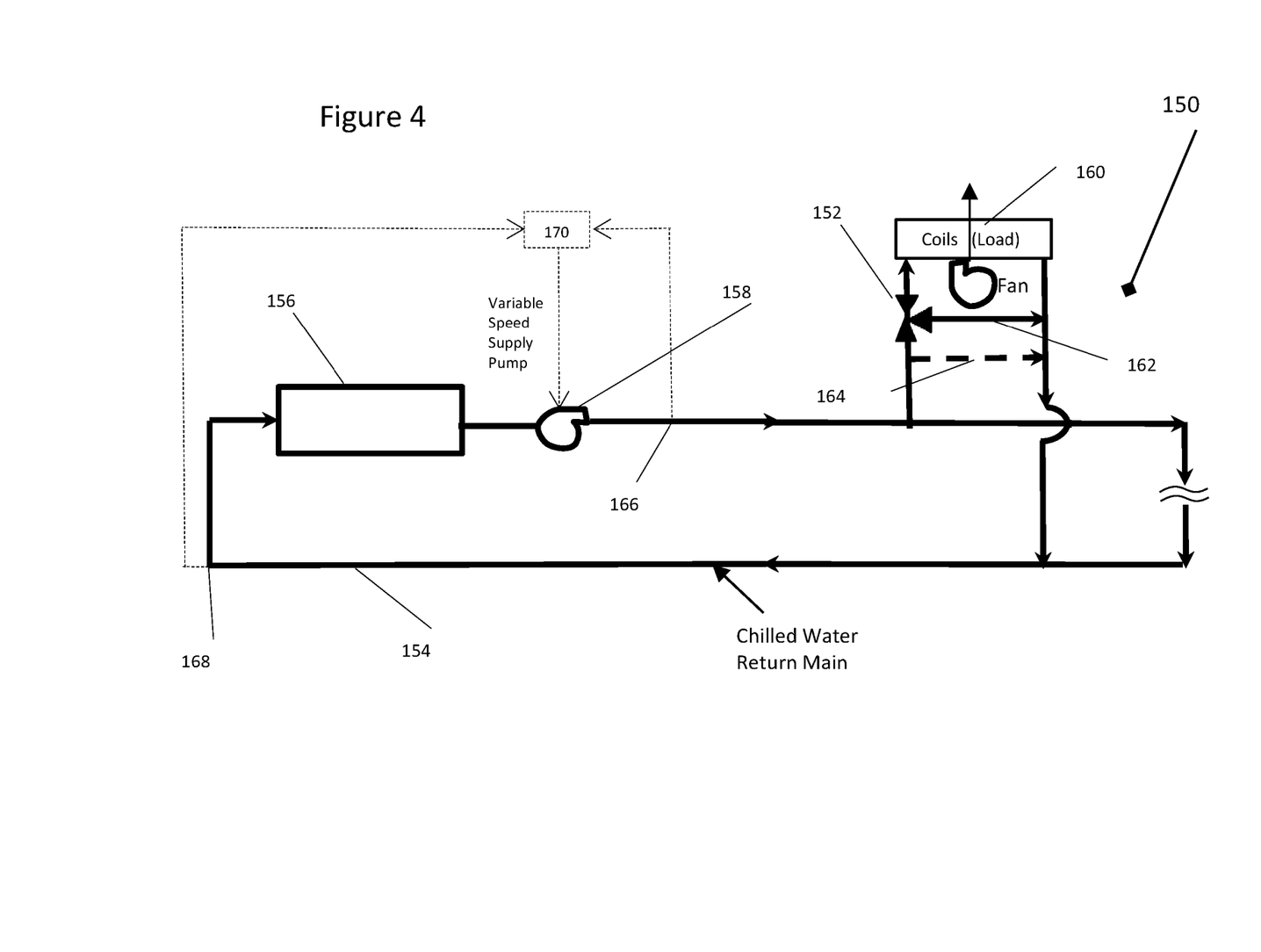
FIG. 4 is a schematic of another embodiment of a closed water loop for use with a building heating or cooling system.

FIG. 4 illustrates a system 150 having a three-way valve 152. The system 150 is a closed loop 154 water circulation system. A thermal source 156 provides conditioned water to the loop 154. The thermal source 156 may be a chiller or a boiler. A pump 158 with a variable frequency drive 159 is provided in the loop 154. The system 150 also contains a building load 160 located downstream of the three way valve 152. A bypass line 162 is often located downstream of the three way valve 152 that allows for the valve 152 to provide flow to the building load 160, or bypass the building load 160 through the bypass line 162. In one embodiment, multiple building loads 160, such as heat exchangers, are present, and may be arranged in parallel, in series, or a combination thereof. In a further embodiment, multiple three-way valves are present as well, allowing for flow in the system 150 to some of the respective building loads 160 while bypassing other building loads 160.

A supply temperature sensor 166 and a return temperature sensor 168 are provided downstream and upstream respectively of the thermal source 156. A controller 170 receives inputs from the temperature sensors 166, 168 and is connected to the pump 158 to control the flow rate of water through the loop 154. The controller 170 may also be connected to the valve 152 to control the direction of flow by the position of the valve 152 and. The controller 170 uses Equation (1) and the control algorithm discussed previously with respect to FIG. 1.

An additional bypass line 164 (in phantom) may be provided upstream of the three-way valve 152 for freeze protection for the system 150. The presence of bypass line 164 precludes pressure control of a system 150 as a flow path for water is provided without valves in the loop 154. Therefore, using a temperature difference across the thermal source 156 provides a means of controlling the system 150.

Referring to FIG. 1, the use of the algorithm to control the operation of a water cooling or heating system 10 based on a temperature differential and the flow rate of water in the system 10 has several benefits including lengthening pump 18 life and reducing energy usage as a result of discrete flow control, reducing the potential for overheating or overcooling a space through the building load 16.

For example, a multiple thermal source system 10 used for cooling includes automatic staging of chillers 12 based on actual building cooling demand, also known as dynamic differential energy control. If multiple chillers and multiple pumps are present, the chilled water temperature control algorithm turns on additional chillers as the capacity of each chiller is exceeded, in sequence.

The controller 26, which may be linked to or integrated into the building automation system continuously calculates the total cooling energy needed for the building, and automatically adjusts the succession of chillers 12 and the pump speed and status of each of the primary and secondary chilled water pumps 18 in sequence based on the actual cooling requirements of the building systems in real time. With a multiple chiller 12 system 10, the sequence of operations includes automatic staging of the chillers 12 based on actual building cooling demand, which may be referred to as dynamic differential energy control (DDEC), through the building loads 16. Chilled water temperature control algorithms automatically turn on additional chillers 12 as the capacity of each chiller is exceeded, in sequence. The building automation system (BAS) continuously calculates the total cooling capacity needed for the building, and automatically adjusts the succession of chillers 12 and each of the primary and secondary chilled water pumps 18 in sequence, based on the actual, real time, cooling requirements of the building systems 16.

In some embodiments, the efficiency of the chiller 12 is improved by monitoring the condenser water temperature entering the chiller 12. Chiller 12 sequencing may be modified based, in part, on the differential temperature (ΔT) of the condenser water achieved by a cooling tower when outside weather conditions are near, or exceed, design limits. If the enthalpy of the outside ambient air increases (due to an increase in temperature and/or humidity) to the point that the cooling tower exceeds its design dew point temperature, the cooling tower capacity is decreased. Additional cooling tower capacity may then be sequenced ON by the controller 26 to maintain overall system efficiencies since condenser water temperature is critical for that purpose.

The chilled water temperature may be reset based on a weather input to prevent over-cooling in mild weather, and minimize re-heat requirements which reduce energy efficiency. This method (DDEC) of building cooling control provides optimal efficiency because it is directly based on the real time cooling requirements for the building.

The hydronic water temperature may be measured at the downstream water temperature sensor 20 in the system 100, and can be reset based on weather, such as outside air temperature, humidity, or enthalpy, in order to prevent over-cooling in mild weather, and to minimize re-heat requirements to reduce energy consumption, and therefore increase the system 10 efficiency.

The chiller 12 efficiency may be further maximized by monitoring the condenser water temperature entering the chiller 12 to cool the water flowing in the system 10. Chiller 12 control and sequencing is modified based on the condenser water temperature achieved by the chiller 12 cooling tower when outside weather conditions are near, or exceed, design limits. As the enthalpy of the outside ambient air increases, due to higher temperature or humidity, the chiller 12 cooling tower may eventually exceed its design cooling capacity due to the ambient air conditions exceeding the cooling tower's design cooling capacity due to the ambient air conditions exceeding the cooling tower's design dew point temperature resulting in the reduction of cooling tower capacity and difficulty in cooling the water in the system 10. The chiller 12 can sequence additional cooling tower capacity to be operational to maintain overall system 10 efficiencies.

In another example, as shown in FIG. 1, a single or multiple boiler 12 system is used for heating. The system heating capacity may be incrementally modified by modifying both the supply water temperature and the heating water volume flow (V), as the heating load increases or decreases. The heating capacity control includes automatic staging of boilers based on actual building heating demand. Automatic staging of boilers 12 is based on actual building heating demand, also known as dynamic differential energy control. Hot water temperature control algorithms turn on additional boilers 12 in sequence as the capacity of each boiler 12 is exceeded based on both temperature and flow through the system as measured in real time, for example in a conventional fire-tube boiler system. In the case of condensing boilers 12, maintaining a specific (ΔT) permits maintaining the efficiency of the boiler. The boiler efficiency can be maintained at design levels, while system heating capacity is incrementally adjusted by adjusting both supply water temperature and flow as the heating load changes.

The controller 26, which may be linked to or integrated into the building automation system, continuously calculates the total heating energy needed for the building, and automatically adjusts the succession of boilers 12, as necessary, and each of the primary and secondary hot water pumps 18 by volume, and in sequence based on the actual heating requirements of the building systems in real time.

The hydronic water temperature in the system 10 can also be reset based on outside air temperature in order to prevent over-heating of secondary heating loads or systems in mild weather, and minimize re-heat requirements which reduce energy efficiency. This is the most efficient method of building heating and cooling control, since it is directly based on the real time system heating requirements.

DDEC, and the system 10 algorithm as based on Equation 5, as described above, may be used with large scale building facilities with many, varied types of loads 16 present. The system 10 algorithm may also be used on a residential building, such as a single family home in conjunction with its hydronic heating system. The algorithm is scalable between small and large buildings, small and large loads, and relatively simple to implement in highly complex facilities.

Figure 5:
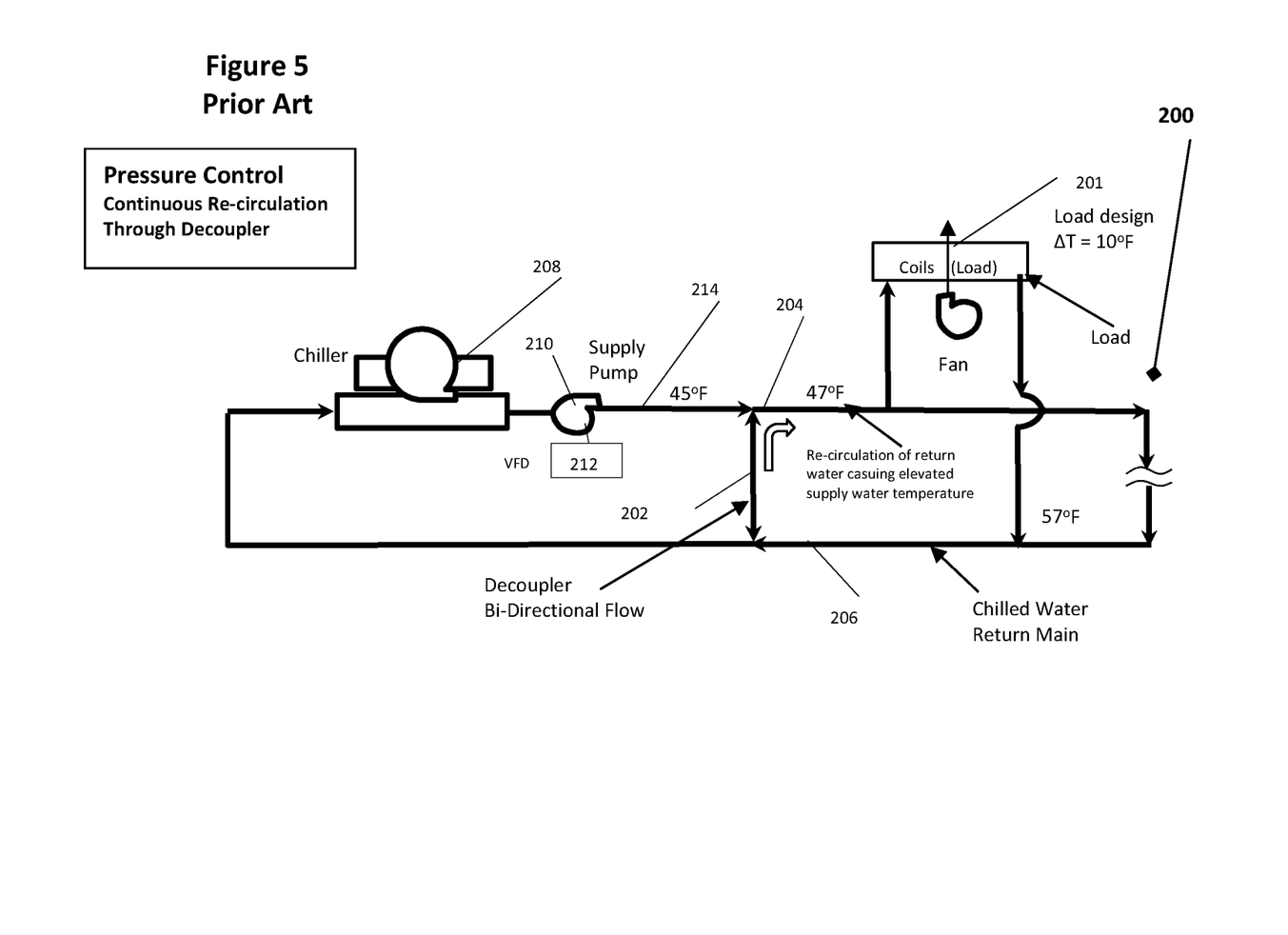
FIG. 5 is a schematic of a closed water loop according to the prior art for use with a building heating or cooling system.

In another example, using large chilled water systems, the prior art large hydronic systems 200 are designed for constant volume circulation of chilled water in primary/secondary circulation loops to a building load 201, as shown in FIG. 5. The system 200 uses a "de-coupler" 202, also called a bridge or pressure equalizer, which is a non-valved, open, by-pass line installed between the supply water pipe 204 and return water pipe 206 ahead of the chiller 208 and pumping system 210. The de-coupler 202 is intended to by-pass water automatically from the supply line 204 to the return line 206 if a momentary pressure imbalance occurs in the system 200. Only one building load 201 is shown in FIG. 5, although the supply line 204 and return line 206 extend, allowing for additional loads on the system 200.

In these large hydronic systems 200, a variable frequency drive 212 of the chilled water pump 210 is used to control pressure through a pressure sensor 214. The pump 210 attempts to maintain a constant flow rate of water in the system 200 by utilizing the de-coupler line 202 which is inserted for continuous automatic pressure balancing.

As shown in FIG. 5, due to continuous changes in flow dynamics in a large hydronic system 200 with a large number of loads 201, the system 200 constantly by-passes warm supply water from the return line 206 into the supply line 204 through the de-coupler 201, which increases the supply water temperature due to the mixing of higher temperature return water with supply water, thereby reducing the cooling capacity in the system 200. An inherent characteristic of these systems 200 is that there is always at least a slight pressure imbalance between supply line 204 and return line 206 pressures. In theory, the volume flow out to the chilled water delivery system ($V_{Supply}$) through the supply line 204 should be equal to the volume flow return ($V_{Return}$) through the return line 206 from the system/building load 201 back to the cooling plant as shown in Equation (6)

$$V_{Supply}=V_{Return} \qquad (8)$$

In practice, however, there is always some recirculation, often very significant, causing both control problems, as well as, major system 200 inefficiencies. Attempting to convert these systems to variable flow using pressure control is problematic, as described previously. DDEC provides a mechanism to accomplish a variable flow conversion without recirculation by equalizing supply flow with load requirements.

Figure 6:
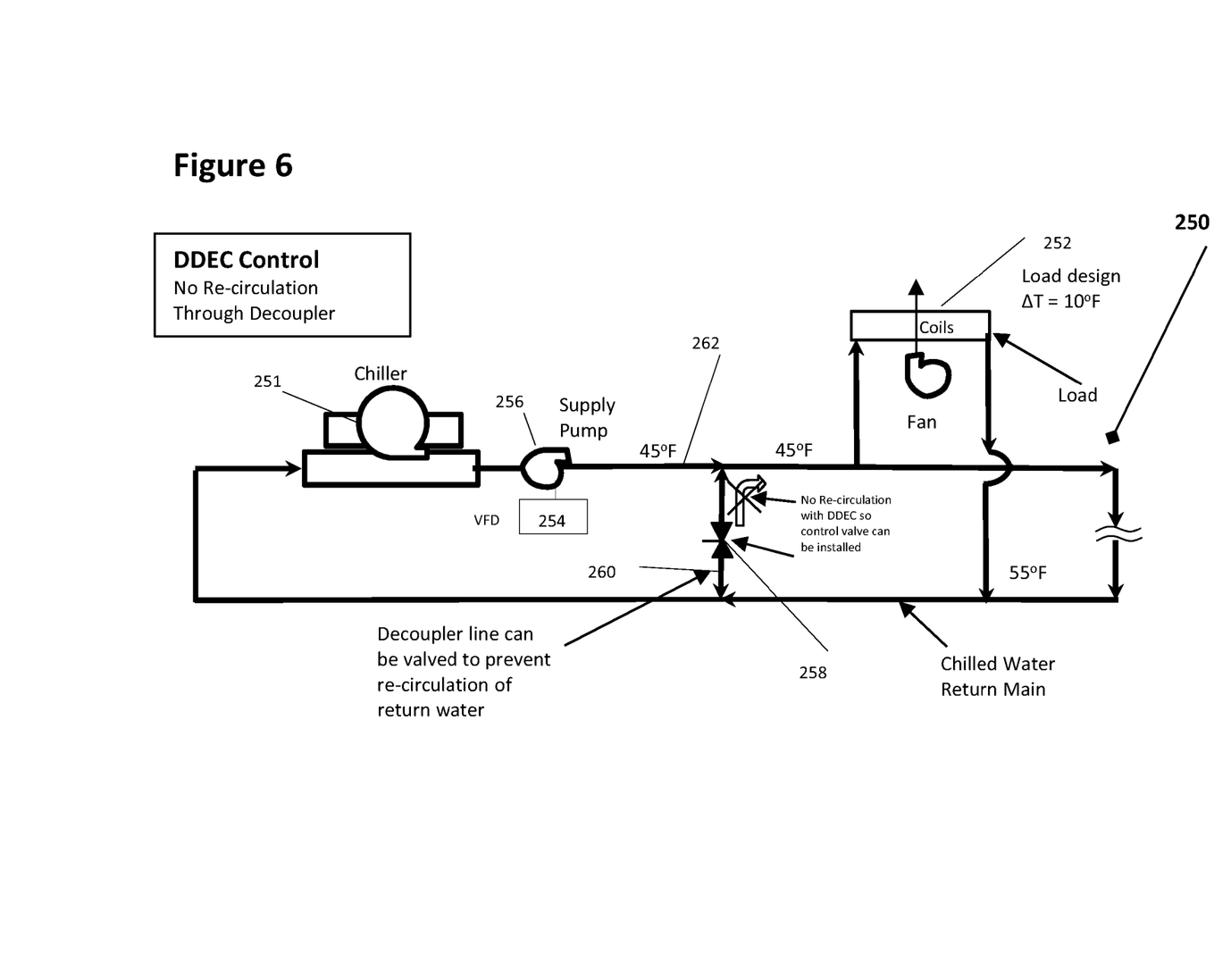
FIG. 6 is a schematic of an embodiment of a closed water loop for use the building heating or cooling system of FIG. 5.

An embodiment of the present invention, as shown by system 250 in FIG. 6, applies dynamic differential energy control (DDEC) to the system shown in FIG. 5. The system 250 provides chilled water using a chiller 251, measures the thermal energy demand (Q) of the building load 252, and adjusts the flow automatically through the variable frequency drives 254 on the primary chilled water 256 and/or secondary supply pumps. A pressure control valve 258, or a check valve, is installed in the de-coupler line 260 to open as a safety valve only if a pressure surge occurs. For example, the pressure by-pass control valve 258 provides pressure relief, if needed, during start-up and shut-down of the pumps 256. The control strategy adjusts the pump 256 speed to deliver appropriate amount of flow through the supply line 262 to satisfy the cooling demand by the building load 252. DDEC continually checks the demand for cooling by the building load 252 in real time, and supplies the appropriate amount of flow (V) at the specified temperature (Ts), such that pressure and flow imbalances are avoided, and recirculation is minimized or eliminated.

The DDEC demand-based control strategy in the system 250 responds directly to the cooling load requirement 252, instead of pressure in the chilled water line (as shown in FIG. 5). DDEC is more effective than pressure-based control due to highly unpredictable pressure and flow dynamics in the system 250, which continuously change as the cooling demand fluctuates, and because pressure does not have an inherent or direct relationship to cooling load 252 required. The DDEC chilled water loop control strategy has the following benefits: eliminating the mixing of return water with chilled water supply in the "de-coupler" (202 in FIG. 5) providing for delivery of design temperature (colder) chilled water to the HVAC systems 252 for better temperature and humidity control; improved efficiency of the chiller plant 251 due to better pump 256 control and more effective use of the chillers 251.

DDEC is especially effective for primary/secondary water loop chiller plants with pumps and/or chillers equipped with variable speed drives, such as system 252 as shown in FIG. 6, with variable speed pumps 256 because the variable speed chiller 251 can operate over a range of flow rates, which allows the pumps 256 to operate at approximately 50% of their peak power draw during non-peak load conditions.

DDEC control is effective because of a heating/cooling system phenomenon termed system thermal response elasticity. For example, although the ΔT, or thermal energy difference, across any individual load may vary from the design value at any given instantaneous time ($\Delta T_i$), (such as for an individual load controller for a supply fan heating coil, for example) the load controller is designed to maintain the discharge temperature from the coil at a constant value. As a result, the $\Delta T$ for the sum of the loads varies only very slightly where the "end control temperature" for systems in this type of example is intended to be maintained at essentially a, static, constant value. The $\Delta T$ across the entire system, therefore, can be maintained at a desired constant differential by varying the volume flow (V) to the system. This is due, in part, to the inherent thermal response elasticity in a multiple-load hydronic flow control system. This elasticity results from the fact that energy delivery is a function of two variables—temperature and volume; and is manifested by the dynamic re-positioning of the valves of each load as the temperature controls in the system function to maintain constant temperatures delivered to spaces, or to secondary/tertiary loads.

The temperature controls of the individual loads in the system respond directly to the flow, if the water supply temperature is held constant ($T_{sc}$). At system design flow volume ($V_{Design}$), on a design day, the individual load control valve may operate at 50% to 100% open ($v_{i(1)-Load}$) to provide sufficient flow in order to maintain discharge air temperature constant in a load (fan unit), for example. For these conditions, if the volume flow rate from the main supply line is decreased, with the supply water temperature held constant, the control valve in the branch line for the load opens more in order to allow sufficient flow (GPM) through the load (cooling coil) to remain constant. The flow through the loads can be managed, over a certain range, to therefore provide constant flow through the load in order to maintain the discharge air temperature of a supply fan unit at a constant setpoint. (Note: Flow is analogous to pressure in this example, so that if the load supply line pressure is reduced, the control valve must open more to maintain a constant flow.) The energy delivered to the load therefore remains constant, even if the flow in the main supply line is reduced ($V_{i(2)-Load}$) because the control valve can open and close so that:

$$q_{i(1)-load} = q_{i(2)-load} \quad (9)$$

Therefore:

$$C \times v_{i(1)Load} \times \Delta t_{i(1)-load} = C \times v_{i(2)-load} \times \Delta t_{i(2)-load} \quad (10)$$

The load flow control valve will continue to open if the flow from the main supply decreases further, until a minimum supply flow is reached ($V_{Min}$) for which the flow control valve for the load must be fully open (100% open) in order to maintain its setpoint parameters. If the supply flow is reduced further, the thermal capacity is exceeded and the discharge air temperature setpoint (in this example) cannot be maintained any longer; and the temperature will begin to rise (in a cooling system). Each load in a system may respond differently. The control range from $V_{Design}$ and $V_{Min}$ is defined as the range of system thermal response elasticity. Alternatively, the elasticity is viewed as the amount of flow which allows a load with the highest demand to be satisfied and reach the setpoint for the load. This is the range over which system volume flow can be varied without causing a negative effect on the setpoints of secondary/tertiary loads.

For example, for a system with ten loads, each with a different heating/cooling requirement, if the flow through the system is reduced, a valve for one of the loads may have to be opened further to satisfy the heating/cooling requirement on that load. Once that valve has opened fully (100% open), any additional demand on the load cannot be satisfied using that system flow. The system flow has to be increased at that point to meet the demand on the load. The system volume is typically not lowered below the most critical load operating fully open (with the other loads at some percentage open). This allows the system to operate at the lowest flow possible to satisfy the system at those operating conditions. The system is typically designed for operation at a design condition, however, this condition may occur only a few times per year, allowing the system to operate at lower flow for the remainder of the year.

While exemplary embodiments are described above, it is not intended that these embodiments describe all possible forms of the invention. Rather, the words used in the specification are words of description rather than limitation, and it is understood that various changes may be made without departing from the spirit and scope of the invention. Additionally, the features of various implementing embodiments may be combined to form further embodiments of the invention.

What is claimed is:

1. A control device for a thermal energy management system having more than one varying thermal loads, the control device comprising:
    a supply temperature sensor positioned in a main supply line upstream of the more than one varying thermal loads;
    a return temperature sensor positioned in a main return line downstream of the more than one varying thermal loads, wherein the more than one varying thermal loads are fluidly connected to and branched from the main supply line and main return line; and
    a controller in communication with the supply temperature sensor and the return temperature sensor, the controller being configured to calculate an actual thermal energy difference across the more than one varying thermal loads using a temperature difference between a supply temperature and a return temperature from the supply and return temperature sensors respectively, and to maintain a desired thermal energy difference by controlling a flow rate of the system and a variable supply temperature of the system in response to a changing actual thermal energy difference such that the actual thermal energy difference is equal to the desired thermal energy difference across the more than one varying thermal loads, thereby instantaneously matching a thermal demand on the more than one varying thermal loads, wherein the controller is configured to increase the flow rate of the system solely based on the temperature difference increasing, and wherein the controller is configured to decrease the flow rate of the system solely based on the temperature difference decreasing.

2. The control device of claim 1 wherein the controller is configured to modify the desired thermal energy difference using an input from at least one of an ambient temperature sensor, a desired setpoint temperature input, a temperature sensor from a discharge side of the thermal load, a humidity sensor, a seasonal ambient temperature database, and an ambient humidity sensor.

3. The control device of claim 1 wherein the controller is configured to control a pump to reduce the flow rate of the system such that a valve controlling a flow rate through one load of the more than one varying thermal loads is at an at least partially open condition when the return temperature of the more than one varying thermal loads is a desired return temperature for the more than one varying thermal loads load.

4. The control device of claim 3 wherein the controller is configured to increase the flow rate of the system if the return temperature for the thermal load is outside the desired return temperature when at least one of the more than one varying thermal loads is unable to meet a demand.

5. A thermal energy management system comprising:
a control system according to claim 1; and
a fluid circuit having a thermal source, a pump, and the more than one varying thermal loads, the main supply line connecting the thermal source to the more than one varying thermal loads, and the main return line connecting the more than one varying thermal loads to the thermal source, wherein the more than one varying thermal loads are branched from the main supply line, and wherein the more than one varying thermal loads are branched to the main return line, wherein the controller is configured to be in communication with the pump;
wherein the pump is a variable speed pump such that the flow rate through the system is adjustable.

6. The thermal energy management system of claim 5 wherein the fluid circuit has a valve positioned upstream of at least one of the more than one varying thermal loads.

7. The thermal energy management system of claim 6 wherein the controller is further configured to control the pump to reduce the flow rate of the system such that a valve controlling a flow rate through at least one of the more than one varying thermal loads is at an at least partially open condition when the return temperature of the loads is a desired return temperature for the loads.

8. The thermal energy management system of claim 5 wherein pressure in the fluid circuit is unmeasured.

9. The control device of claim 5 wherein the controller is configured to be in communication with the thermal source; and
wherein the controller is further configured to control the thermal source to continuously modify the variable supply temperature to a desired supply temperature within a range of supply temperatures.

10. The control device of claim 5 wherein the more than one varying thermal loads are arranged in series with one another.

11. The control device of claim 5 wherein the more than one varying loads are arranged in a combination of in parallel and in series with one another.

12. The control device of claim 5 wherein the supply temperature sensor is positioned in the main supply line at an outlet of the thermal source; and
wherein the return temperature sensor is positioned in the main return line at an inlet to the thermal source.

13. The control device of claim 1 further comprising a user interface in communication with the controller, the user interface providing a user input to the controller;
wherein a user input is one of a location, a weather zone, a pipe size, a chilled water system, a hot water system, and a system architecture type.

14. The control device of claim 1 wherein the controller is further configured to modify the desired thermal energy difference to accommodate a different thermal load on the system as the supply temperature, and therefore also the return temperature vary in response to external conditions including a changing thermal load based on a weather change.

15. The control device of claim 1 wherein the more than one varying thermal loads are heat sinks; and
wherein the controller is configured to increase the flow rate of the system if a measured difference between a variable supply temperature and resultant return temperature for the loads is greater than a desired temperature difference for the loads.

16. The control device of claim 1 wherein the more than one varying thermal loads are heat sources; and
wherein the controller is configured to increase the flow rate of the system if a measured difference between a variable supply temperature and resultant return temperature for the loads is less than a desired temperature difference for the loads.

17. The control device of claim 1 wherein the temperature difference measured by the supply and return temperature sensors is equal to a temperature difference across a thermal source.

18. The control device of claim 1 wherein the controller is further configured to calculate the actual thermal energy difference as being directly proportional to the temperature difference when taken instantaneously.

19. A control device for a thermal energy management system having more than one varying thermal loads, the control device comprising:
a supply temperature sensor positioned in a main supply line upstream of the more than one varying thermal loads;
a return temperature sensor positioned in a main return line downstream of the more than one varying thermal loads, wherein the more than one varying thermal loads are fluidly connected to and branched from the main supply line and main return line; and
a controller in communication with the supply temperature sensor and the return temperature sensor, the controller being configured to calculate an actual thermal energy difference across the more than one varying thermal loads using a temperature difference between an instantaneous supply temperature and a return temperature from the supply and return temperature sensors respectively, the instantaneous temperature difference being directly proportional to an instantaneous thermal energy difference, and to maintain a desired thermal energy difference without actually calculating a numerical value for thermal energy by controlling a flow rate of the system and a variable supply temperature of the system in response to a changing actual thermal energy demand such that the actual thermal energy difference is directly proportional to a desired instantaneous temperature difference across the more than one varying thermal loads, thereby instantaneously matching a thermal demand on the more than one varying thermal loads, wherein the controller is configured to increase the flow rate of the system solely based on the instantaneous temperature difference increasing, and wherein the controller is configured to decrease the flow rate of the system solely based on the instantaneous temperature difference decreasing.

* * * * *

UNITED STATES PATENT AND TRADEMARK OFFICE
CERTIFICATE OF CORRECTION

PATENT NO. : 9,519,297 B1
APPLICATION NO. : 13/208603
DATED : December 13, 2016
INVENTOR(S) : Virskus It is certified that error appears in the above-identified patent and that said Letters Patent is hereby corrected as shown below:

In the Claims

Column 13, Line 3, Claim 3:
After "varying thermal loads"
Delete "load".

Signed and Sealed this
Sixth Day of June, 2017

Michelle K. Lee
*Director of the United States Patent and Trademark Office*